(12) United States Patent
Morman et al.

(10) Patent No.: US 6,295,495 B1
(45) Date of Patent: Sep. 25, 2001

(54) METHOD FOR MULTI-DIRECTIONAL ANTICIPATORY ARMING OF VEHICLE RESTRAINTS

(75) Inventors: Kenneth Nero Morman, West Bloomfield; Kwaku O. Prakah-Asante, Commerce Township, both of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/681,531

(22) Filed: Apr. 24, 2001

(51) Int. Cl.[7] .................................................. G01S 13/93
(52) U.S. Cl. ............................................. 701/45; 340/903
(58) Field of Search .................................. 701/45, 36, 46, 701/47; 180/271, 169; 280/734; 340/436, 903

(56) References Cited

U.S. PATENT DOCUMENTS

| | | |
|---|---|---|
| 5,036,467 | 7/1991 | Blackburn et al. . |
| 5,430,649 | 7/1995 | Cashler et al. . |
| 5,587,906 | 12/1996 | McIver et al. . |
| 5,684,701 | 11/1997 | Breed . |
| 5,777,225 | 7/1998 | Sada et al. . |
| 5,826,216 | 10/1998 | Lyons et al. . |
| 5,835,007 | 11/1998 | Kosiak . |
| 5,845,729 | 12/1998 | Smith et al. . |
| 5,936,549 | 8/1999 | Tsuchiya . |
| 6,031,848 | 2/2000 | Bullinger et al. . |
| 6,032,092 | * 2/2000 | Laaser ..................................... 701/45 |
| 6,070,115 | * 5/2000 | Oestreicher et al. ................... 701/45 |
| 6,213,510 | * 4/2001 | Sugama .................................. 701/45 |
| 6,216,070 | * 4/2001 | Hagashi et al. ........................ 701/45 |

FOREIGN PATENT DOCUMENTS 0 728 624 A3   11/1996   (EP) .

* cited by examiner

*Primary Examiner*—Richard M. Camby
(74) *Attorney, Agent, or Firm*—Gary A. Smith

(57) ABSTRACT

A method for multi-directional anticipatory arming of restraint systems in a motor vehicle includes the steps of monitoring outputs from impact radar sensors located on the vehicle. The method also includes the steps of determining whether an impact range is less than a predetermined value, obtaining a closing velocity (CV), and determining a supervisory time window (STW). The method further includes the steps of determining whether at least one of the CV and STW are within predetermined limits and setting a velocity arming flag to activation of the restraint systems if the CV and STW are within the predetermined limits.

22 Claims, 3 Drawing Sheets

METHOD FOR MULTI-DIRECTIONAL ANTICIPATORY ARMING OF VEHICLE RESTRAINTS

BACKGROUND OF THE INVENTION

The present invention relates generally to restraint systems for vehicles and, more specifically, to a method for multi-directional anticipatory arming of restraint systems for a motor vehicle.

It is known that motor vehicles such as automotive vehicles often employ restraint systems such as front airbags, side airbags, and pretension seat belts to help protect an occupant during an impact on the vehicle. Decision making for activation of these restraint systems is mainly based on signals from accelerometers. Sensing and deployment control algorithms embedded in a microprocessor determine whether an impact has occurred by monitoring the signals from the accelerometers. The severity of the impact is computed and the restraint systems are activated based on established thresholds. In addition to an impact sensor, a mechanical arming sensor is often employed to guard against inadvertent deployment due to electronic failure. The sensitivity of the arming sensors is selected to make sure no activation results from normal driving conditions.

For improved occupant protection and performance, restraint systems have to be robust in decision making to avoid inadvertent deployment during low speed impacts and rough driving conditions. Performance specifications, as to the restraint systems to activate under various impact conditions, are important. When an impact occurs, the sensing and control algorithms have to confirm that an impact has occurred and decide what restraint system to deploy before the energy of the impact is transmitted to the occupants of the vehicle.

Therefore, it is desirable to provide information about a potential imminent collision or impact and selectively prepare appropriate restraint systems for activation after an impact for improved occupant protection. It is also desirable to provide multi-directional arming of restraints in a vehicle for improved occupant protection. As a result, there is a need in the art to provide a method for multi-directional anticipatory arming of restraint systems in a motor vehicle that meets these desires.

SUMMARY OF INVENTION

Accordingly, the present invention is a method for multi-directional anticipatory arming of restraint systems in a motor vehicle including the steps of monitoring outputs from impact radar sensors located on the vehicle. The method also includes the steps of determining whether an impact range is less than a predetermined value, obtaining a closing velocity (CV), and determining a supervisory time window (STW). The method further includes the steps of determining whether at least one of the CV and STW are within predetermined limits and setting a velocity arming flag to activation of the restraint systems if the CV and STW are within the predetermined limits.

One advantage of the present invention is that a method for multi-directional anticipatory arming of restraint systems is provided for a motor vehicle. Another advantage of the present invention is that the method for multi-directional anticipatory arming of restraint systems provides information about a potential imminent collision or impact and selectively prepares appropriate restraint systems for activation after an impact for improved occupant protection. Yet another advantage of the present invention is that the method for multi-directional anticipatory arming of restraint systems employs an integrated multi-variable front and side radar anticipatory sensors for supervisory arming of multiple restraint systems. Still another advantage of the present invention is that the method targets deployment of only restraint systems meeting requirements for arming and activation, which is important in optimizing restraint performance and minimizing costs. A further advantage of the present invention is that the method combines impact zone verification and closing velocity of obstacles for plausibility checks on the potential for impact. Yet a further another advantage of the present invention is that the method determines a Supervisory Time Window (STW) based on vehicle closing velocity and variable range, which sets specific time windows for tailored arming of restraints based on restraint system characteristic response. Still a further advantage of the present invention is that the method incorporates supervisory arming function, which sets range, obstacle front/side direction, and closing velocity conditional flags for additional performance reliability for restraint systems. Another advantage of the present invention is that the method incorporates a supervisory time window (STW) and threshold closing velocity (TCV) function for targeted robust non-deployment conditions at low speeds. Yet another advantage of the present invention is that the method employs an acceleration threshold adjustment, which allows variable degree of contribution from pre-crash closing velocity, impact velocity change, and initial condition thresholds for robust threshold adjustment. Still another advantage of the present invention is that the method employs an adjustment mechanism, which is an adaptive gain based on radar return degree of confidence, which is advantageous in minimizing any error due to radar signals. A further advantage of the present invention is that the method is robust in reverting to impact acceleration thresholds and the change in velocity after impact, if the radar performance is not met. Yet a further advantage of the present invention is that the method incorporates hierarchical supervisory role of the multi-directional arming function ensures additional input from the impact environment is sent to deployment control algorithms, which send signals to the restraint systems, assuring optimum performance.

Other features and advantages of the present invention will be readily appreciated, as the same becomes better understood, after reading the subsequent description when considered in connection with the accompanying drawings.

DETAILED DESCRIPTION

Figure 1:
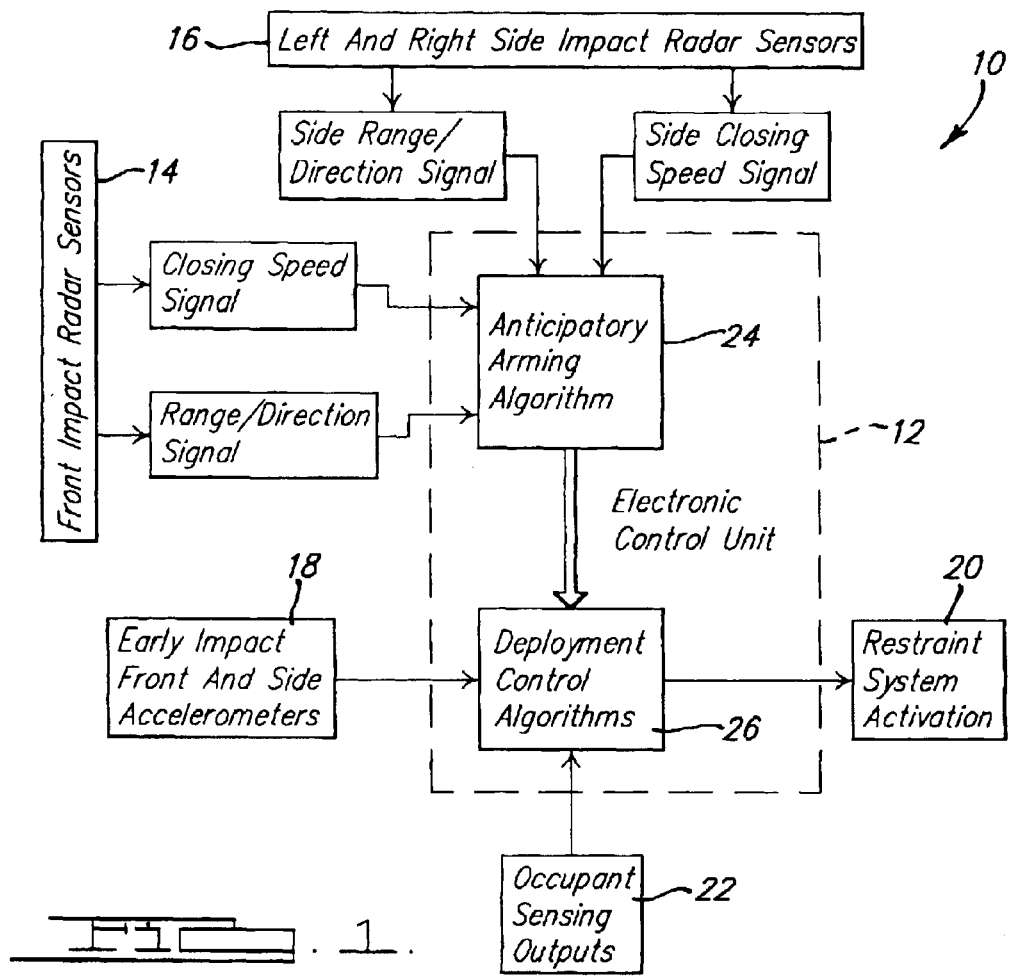
FIG. 1 is a block diagrammatic view of a multi-directional anticipatory arming system, according to the present invention.

Referring to the drawings and in particular FIG. 1, one embodiment of a multi-directional anticipatory arming system 10, according to the present invention, is shown for a motor vehicle (not shown). The multi-directional anticipatory arming system 10 includes an electronic control unit or module 12 for receiving input signals and providing output signals in response to receiving the input signals. The multi-directional anticipatory arming system 10 also includes a plurality of input devices for generating the input signals. The input devices include front impact radar sensors 14, which provide an input signal of a frontal impact range/direction and frontal impact closing speed to the control module 12. The input devices also include side impact radar sensors 16, which provide an input signal to the control module 12 of a left and right side impact range/direction and side impact closing speed. The input devices further include early impact front and side accelerometers 18, which provide an input signal to the control module 12 of a front or side impact of the motor vehicle. It should be appreciated that the radar sensors 14 and 16 are placed in the front and side of the motor vehicle to obtain multi-directional information about the impact environment. It should also be appreciated that the control module 12, sensors 14 and 16, and accelerometers 18 are conventional and known in the art.

The multi-directional anticipatory arming system 10 also includes a plurality of output devices activated by the control module 12 in response to the input signals. The output devices include at least one restraint system 20. The restraint system 20 may be of a system such as front airbags, side airbags, and pretension seat belts to help protect an occupant during an impact on the motor vehicle. The multi-directional anticipatory arming system 10 further includes occupant sensors 22, which provide occupant-sensing inputs, such as whether an occupant is present, to the control module 12 in the motor vehicle. It should be appreciated that the restraint system 20 is conventional and known in the art.

Finally, the multi-directional anticipatory arming system 10 includes an anticipatory arming method or algorithm 24, according to the present invention, embedded in the control module 12 and at least one deployment control algorithm 26 embedded in the control module 12. The anticipatory arming algorithm 24 receives inputs from the radar sensors 14 and 16 and provides an output to the deployment control algorithm 26. The deployment control algorithm 26 also receives an input from the accelerometers 18 and occupant sensing outputs 22 and provides an output to the restraint system 20. The control module 12 and each of the input and output devices 14 through 22 are powered by a vehicle battery/fuse box system (not shown) and the multi-directional anticipatory arming system 10 is grounded to a frame (not shown) of the motor vehicle. It should be appreciated that the input and output devices 14 through 22 are connected to the control module 12 and battery/fuse box system via electrical connectors (not shown). It should also be appreciated that the deployment control algorithms 26 are conventional and known in the art.

In operation, the multi-directional anticipatory arming system 10 provides information about a potential imminent impact and selectively prepares the appropriate restraint system 20 for activation after an impact for improved occupant protection. The closing speed, range, and impact direction in a pre-defined pre-crash zone is obtained from the radar sensors 14 and 16. The anticipatory arming method 24 determines a predetermined imminent time to impact such as 150 milliseconds (ms) and sends conditional flags to the deployment control algorithms to set which restraint systems 20 to deploy or not to deploy. Closing speed and direction of impact comparisons are made by the anticipatory arming method 24. The acceleration thresholds are adjusted based on pre-impact closing velocities. The algorithm 26 decides which restraint systems 20 to deploy before the impact, and the impact accelerometers 18 have sufficient time to confirm that an impact has occurred and deploy restraints before energy is transmitted to the occupant.

Figure 4:
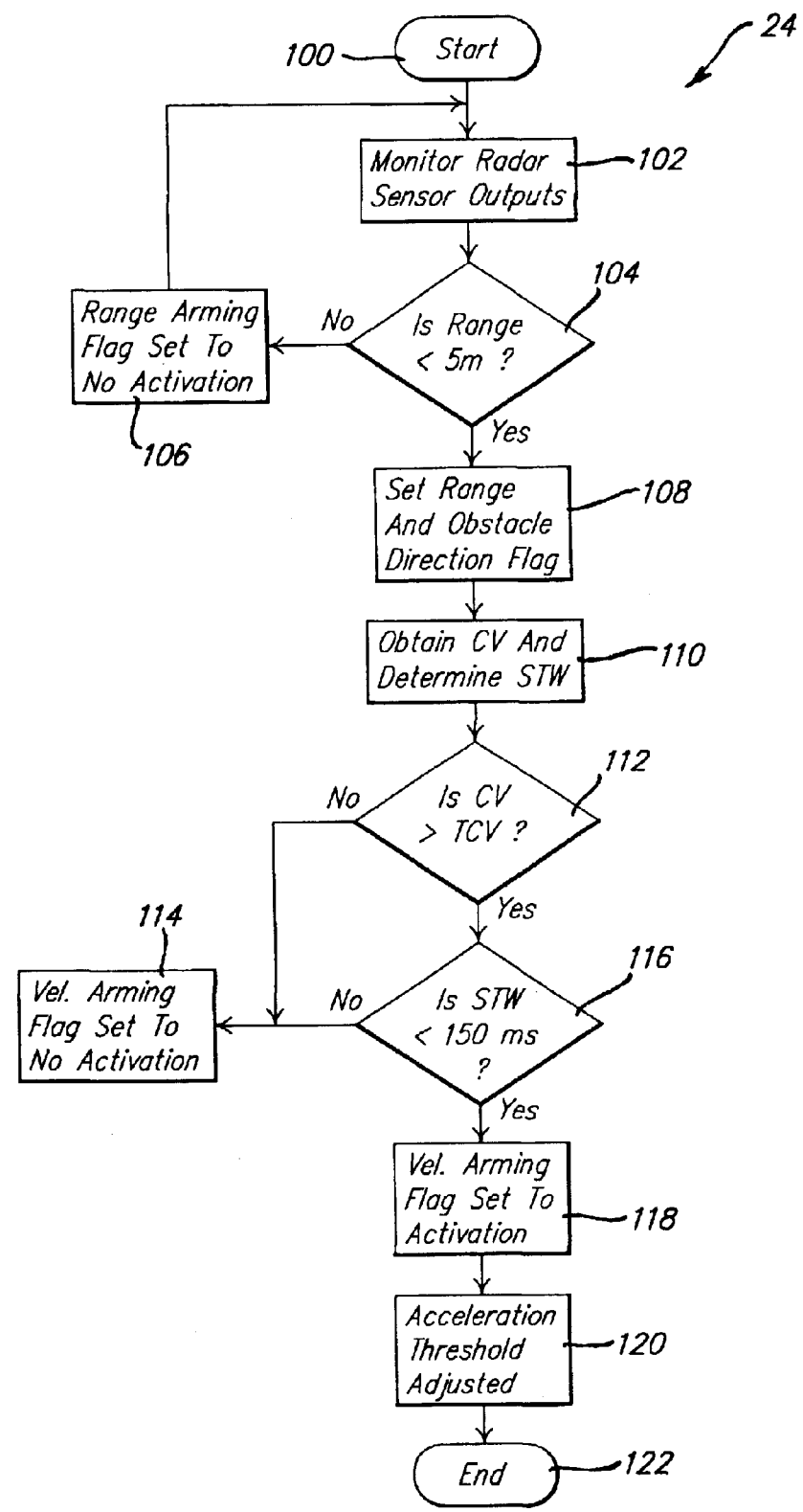
FIG. 4 is a flowchart of a method, according to the present invention, for the multi-directional anticipatory arming system of FIG. 1.

Referring to FIG. 4, a method 24, according to the present invention, of anticipatory arming of the multi-directional anticipatory arming system 10 is shown. The method 24 starts in bubble 100 and advances to block 102. In block 102, the method includes the step of monitoring the outputs of the radar sensors 14 and 16. The control module 12 receives inputs from the radar sensors 14 and 16. The radar sensors 14 and 16 are used to obtain information about a Closing Velocity (CV), range, and direction of impact. The radar sensors 14 and 16 are located in the front and at the side of the motor vehicle, giving a multi-directional front and side detection capability. It should be appreciated that the outputs from the radar sensors 14 and 16, after signal processing, are sent to the control module 12.

After block 102, the method advances to diamond 104 and includes the step of determining whether a crash or impact zone or range is less than a predetermined distance such as five meters (5 m) relative to the motor vehicle. In one embodiment, an impact or crash zone of 5 m for the front and side of the motor vehicle is set as the zone for potential collision. The control module 12 determines whether the impacting object is within the impact zone based on the input signals from the radar sensors 14 and 16. If not, the method advances to block 106 and sets a range arming flag to no activation. The method then returns to block 102 previously described.

Figures 2, 3:
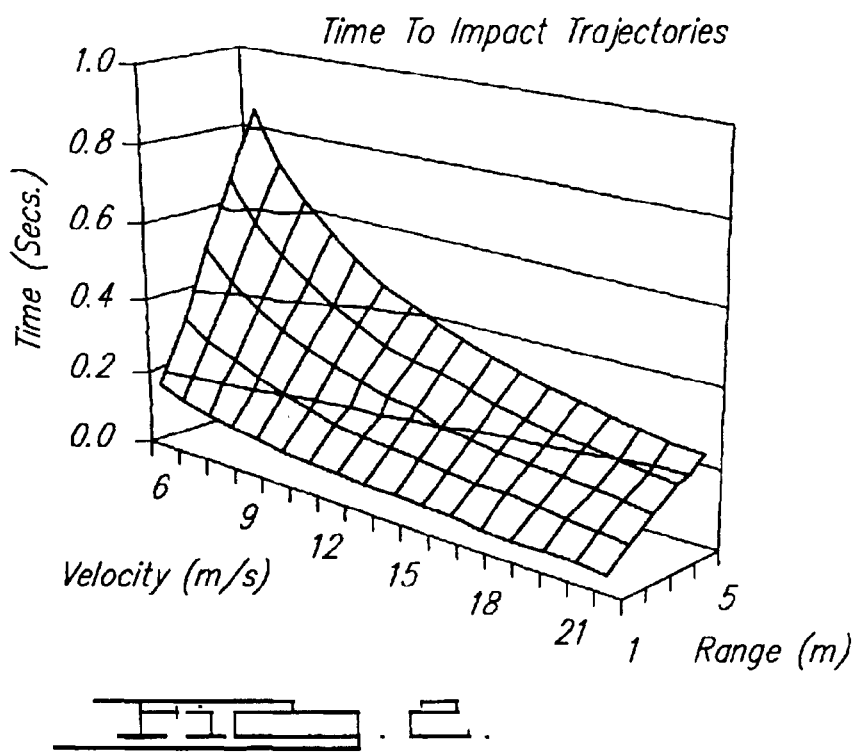
FIG. 2 is a graph of time to impact trajectories for the multi-directional anticipatory arming system of FIG. 1.
FIG. 3 is a graph of a supervisory time window for the multi-directional anticipatory arming system of FIG. 1.

In diamond 104, if the impact range is less than 5 m, the method advances to block 108 and sets a range and obstacle direction flag. The method then advances to block 110 and includes the step of obtaining the CV and determining a Supervisory Time Window (STW). The control module 12 obtains the CV from the input signals from the radar sensors 14 and 16. When an obstacle is in the potential crash zone or range, the control module 12 determines a constant STW of a predetermined time such as 150 milliseconds (ms) depending on the closing speed. The STW before impact or collision is the time period for arming the restraint systems 20 for tailored activation. Possible times (seconds) to impact trajectories for various velocities (m/s) in the 5 m range are empirically derived, pre-programmed in the control module 12, and are illustrated in FIG. 2. The STW for each speed or velocity (m/s) for a given range (m) is empirically derived, pre-programmed in the control module 12, and are illustrated in FIG. 3. It should be appreciated that, when collision is imminent from the supervisory constant time to impact window, plausibility checks and conditions are then set for the method 24 as subsequently described and illustrated in FIG. 4.

After block 110, the method advances to diamond 112 and includes the step of determining whether the CV is greater than a predetermined threshold closing velocity (TCV). The TCV is pre-programmed in the control module 12 and the control module 12 compares the CV to the TCV. If not, the method advances to block 114 and includes the step of setting a velocity arming flag to no activation of the restraint system 20. It should be appreciated that, to compensate for low-speed collisions, if collision occurs and the post-impact threshold closing velocity is not armed for activation, deployment of the restraint systems 20 by the deployment control algorithm 26 does not occur.

In diamond 112, if the CV is greater than the TCV, the method advances to diamond 116 and includes the step of determining whether the STW is less than a predetermined time such as 150 ms. The predetermined time is preprogrammed in the control module 12 and the control module 12 compares the STW to the predetermined time. If not, the method advances to block 114 previously described. If so, the method advances to block 118 and includes the step of setting the velocity arming flag to activation of the restraint system 20. It should be appreciated that the restraint systems 20 such as the driver, passenger front airbags and side airbags are deployed by the deployment control algorithm 26 if the range and obstacle direction flag and velocity arming flag are set, allowing deployment of only required restraint systems 20. It should also be appreciated that the restraint systems 20 are deployed by the deployment control algorithm 26 after confirmation of an impact by the accelerometers 18.

After block 118, the method advances to block 120 and includes the step of adjusting an acceleration threshold (AT). The control module 12 adjusts the AT.

The ATs before impact are adjusted based on the CV and a base calibrated AT. On impact, the AT is calculated based on the CV, the change in velocity during impact, and the calibrated AT. The equation governing the adjustment of the AT is given by:

$$AT_{new} = AT_{cal} + [K_1 * (AT_{cal}/TCV) * CV] + K_2 * \Delta V$$

Where: $AT_{new}$ is the new acceleration threshold;
$AT_{cal}$ is the base calibrated acceleration threshold;
$K_1$ is an adaptive gain based on confidence levels of the signals from the radar sensors 14 and 16; $K_2$ is a $\Delta V$ tuning gain; and
$\Delta V$ is the change in velocity after impact.

Figure 5:
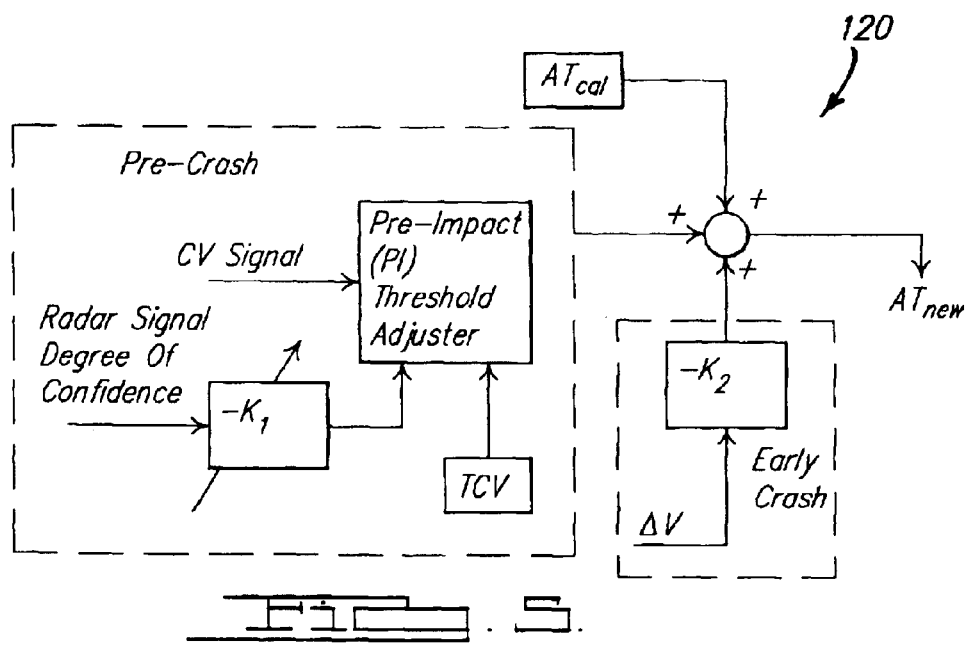
FIG. 5 is a block diagrammatic view of an acceleration threshold function for the multi-directional anticipatory arming system of FIG. 1.

As illustrated in FIG. 5, a block diagram of the acceleration threshold adjustment functionality is shown. After block 120, the method advances to bubble 122 and ends.

Accordingly, the multi-directional anticipatory arming system 10 and method 24 provides information about a potential imminent collision and selectively prepares appropriate restraint systems 20 for activation. The restraint systems 20 are armed based on the method 24, which use as inputs the closing speed of the obstacles, the range, and direction of impact from the radar sensors 14 and 16.

The restraint systems 20 are activated after early crash impact accelerometers 18 confirm that an impact has occurred. The anticipatory arming method 24 compensates for weak acceleration crash signals such as from pole type crashes by providing additional input about the crash environment. The arming method 24 also presents additional reliability to the restraint systems 20 by discriminating between no fire crashes or events at low speeds less than 12 to 16 kmph and fire events. It should be appreciated that additional inputs from the crash environment improves the reliability of the restraint systems 20.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A method for multi-directional anticipatory arming of restraint systems for a vehicle comprising the steps of:
   monitoring outputs from impact radar sensors located on the vehicle;
   determining whether an impact range is less than a predetermined value;
   obtaining a closing velocity (CV);
   determining a supervisory time window (STW);
   determining whether at least one of the CV and STW are within predetermined limits; and
   setting a velocity arming flag to activation of the restraint systems if the CV and STW are within the predetermined limits.

2. A method as set forth in claim 1 including the step of setting a range arming flag to no activation of the restraint systems if the impact range is not less than the predetermined value.

3. A method as set forth in claim 1 including the step of setting a range and obstacle direction flag if the impact range is less than the predetermined value.

4. A method as set forth in claim 1 wherein said step of determining whether at least one of the CV and STW are within predetermined limits comprises determining whether the CV is less than a threshold closing velocity (TCV).

5. A method as set forth in claim 4 including the step of setting a velocity arming flag to no activation of the restraint systems if the CV is not less than the TCV.

6. A method as set forth in claim 4 including the step of determining if the STW is less than a predetermined time if the CV is less than the TCV.

7. A method as set forth in claim 6 including the step of setting a velocity arming flag to no activation of the restraint systems if the STW is not less than the predetermined time.

8. A method as set forth in claim 1 including the step of adjusting an acceleration threshold.

9. A method as set forth in claim 8 wherein said step of adjusting comprises aggregate contribution from a pre-crash closing velocity, impact velocity change, and initial condition thresholds for robust acceleration threshold adjustment.

10. A method as set forth in claim 8 wherein said step of adjusting includes an adaptive gain based on radar return degree of confidence.

11. A method as set forth in claim 8 wherein said step of adjusting includes reverting to crash acceleration thresholds and a change in velocity after impact if radar performance is not met.

12. A method as set forth in claim 1 wherein said step of obtaining the CV comprises obtaining the CV based on signals from the impact radar sensors on the motor vehicle.

13. A method as set forth in claim 1 wherein said step of determining the STW comprises determining the STW from range and velocity values programmed into a control module.

14. A method as set forth in claim 1 including the step of locating at least one impact radar sensor at a front and side of the vehicle prior to said step of monitoring.

15. A method for multi-directional anticipatory arming of restraint systems for a motor vehicle comprising the steps of:
   monitoring outputs from impact radar sensors located on the vehicle;
   determining whether an impact range is less than a predetermined value;
   obtaining a closing velocity (CV);
   determining a supervisory time window (STW);
   determining whether the CV is less than a threshold closing velocity (TCV);
   determining if the STW is less than a predetermined time if the CV is less than the TCV; and
   setting a velocity arming flag to activation of the restraint systems if the STW is less than the predetermined time.

16. A method as set forth in claim 15 including the step of setting a range arming flag to no activation of the restraint systems if the impact range is not less than the predetermined value.

17. A method as set forth in claim 15 including the step of setting a range and obstacle direction flag if the impact range is less than the predetermined value.

18. A method as set forth in claim 15 wherein said step of setting a velocity arming flag to no activation of the restraint systems if the CV is not less than the TCV.

19. A method as set forth in claim 15 including the step of setting a velocity arming flag to no activation of the restraint systems if the STW is not less than the predetermined time.

20. A method as set forth in claim 15 wherein said step of obtaining the CV comprises obtaining the CV based on signals from the impact radar sensors on the motor vehicle.

21. A method as set forth in claim 15 wherein said step of determining the STW comprises determining the STW from range and velocity values programmed into a control module.

22. A method for multi-directional anticipatory arming of restraint systems for a motor vehicle comprising the steps of:

monitoring outputs from impact radar sensors located on the vehicle;

determining whether an impact range is less than a predetermined value;

setting a range arming flag to no activation of the restraint systems if the impact range is not less than the predetermined value;

setting a range and obstacle direction flag if the impact range is less than the predetermined value;

obtaining a closing velocity (CV);

determining a supervisory time window (STW);

determining whether the CV is less than a threshold closing velocity (TCV);

setting a velocity arming flag to no activation of the restraint systems if the CV is not less than the TCV;

determining if the STW is less than a predetermined time if the CV is less than the TCV;

setting a velocity arming flag to no activation of the restraint systems if the STW is not less than the predetermined time; and setting a velocity arming flag to activation of the restraint systems if the STW is less than the predetermined time.

\* \* \* \* \*